(12) United States Patent
Kim

(10) Patent No.: US 11,184,932 B2
(45) Date of Patent: Nov. 23, 2021

(54) METHOD FOR PERFORMING RACH PROCEDURE BETWEEN TERMINAL AND BASE STATION, AND BASE STATION AND TERMINAL THEREFOR

(71) Applicant: Samsung Electronics Co., Ltd., Suwon-si (KR)

(72) Inventor: Woon-Kyung Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 16/632,727

(22) PCT Filed: Dec. 15, 2017

(86) PCT No.: PCT/KR2017/014784
§ 371 (c)(1),
(2) Date: Jan. 21, 2020

(87) PCT Pub. No.: WO2019/022314
PCT Pub. Date: Jan. 31, 2019

(65) Prior Publication Data
US 2021/0153256 A1 May 20, 2021

(30) Foreign Application Priority Data
Jul. 28, 2017 (KR) .................... 10-2017-0096171

(51) Int. Cl.
*H04W 74/08* (2009.01)
*H04W 76/27* (2018.01)
(Continued)

(52) U.S. Cl.
CPC ....... *H04W 74/0833* (2013.01); *H04W 72/14* (2013.01); *H04W 74/006* (2013.01); *H04W 76/27* (2018.02)

(58) Field of Classification Search
None
See application file for complete search history.

(56) References Cited

U.S. PATENT DOCUMENTS

2009/0175292 A1   7/2009   Noh et al.
2009/0259910 A1   10/2009  Lee et al.
(Continued)

FOREIGN PATENT DOCUMENTS

KR   10-2014-0033221 A   3/2014
KR   10-1519345 B1       5/2015
(Continued)

OTHER PUBLICATIONS

3GPP TS 36.321 V14.3.0 (Jun. 2017) available from 3GPP.org (Year: 2017).*
(Continued)

*Primary Examiner* — Jamaal Henson
(74) *Attorney, Agent, or Firm* — Jefferson IP Law, LLP

(57) ABSTRACT

The disclosure relates to a pre-5th-generation (5G) or 5G communication system to be provided for supporting higher data rates beyond 4th-generation (4G) communication system such as long term evolution (LTE). According to an embodiment of the present disclosure, when a base station performs a random access channel (RACH) procedure with a terminal, the base station can receive a random access (RA) preamble from the terminal, generate a random access response (RAR) message including an uplink grant allocated to the terminal, allocate a physical downlink control channel resource through which the generated RAR message is to be transmitted, transmit the RAR message to the terminal through the allocated physical downlink control channel resource, and receive a radio resource control (RRC) layer connection request message from the terminal through a resource allocated to the terminal by the uplink grant. The present research has been conducted with support from the (Continued)

"Cross-Departmental Giga-KOREA Project" funded by the government (Ministry of Science and ICT) in 2017 (No. GK17N0100, development of a millimeter wave 5G mobile communication system).

15 Claims, 8 Drawing Sheets

(51) Int. Cl.
*H04W 72/14* (2009.01)
*H04W 74/00* (2009.01)

(56) References Cited

U.S. PATENT DOCUMENTS

| | | |
|---|---|---|
| 2010/0124188 A1 | 5/2010 | Wu |
| 2012/0300714 A1 | 11/2012 | Ng et al. |
| 2013/0034071 A1 | 2/2013 | Lee et al. |
| 2013/0039308 A1 | 2/2013 | Lee |
| 2014/0355539 A1 | 12/2014 | Yang et al. |
| 2015/0181624 A1* | 6/2015 | Hwang ............... H04L 5/0053 370/329 |
| 2017/0013643 A1* | 1/2017 | Nan ............... H04W 74/0833 |
| 2017/0150523 A1* | 5/2017 | Patel ............... H04L 5/0048 |

FOREIGN PATENT DOCUMENTS

| | | |
|---|---|---|
| KR | 10-1563469 B1 | 10/2015 |
| WO | 2010/124228 A2 | 10/2010 |
| WO | 2012/177060 A2 | 12/2012 |
| WO | 2017/078185 A1 | 5/2017 |

OTHER PUBLICATIONS

3GPP TS 36.321 V 14.3.0 (Jun. 2017) Available at 3GPP.org (Year: 2017).*
Extended European Search Report dated Aug. 3, 2020, issued in European Application No. 17918890.9-1231.
Korean Office Action dated Mar. 15, 2021, issued in Korean Application No. 10-2017-0096171.

* cited by examiner

| Value(hexa-decimal) | RNTI |
|---|---|
| 0000 | N/A |
| 0001-003C | RA-RNTI, C-RNTI, Temporary C-RNTI |
| 003D-FFF3 | C-RNTI, Temporary C-RNTI |
| FFF4-FFFF | Reserved |

FIG.2

| R | Timing Advance Command | Oct 1 |
| Timing Advance Command | UL Grant | Oct 2 |
| UL Grant | Oct 3 |
| UL Grant | Oct 4 |
| Temporary C-RNTI | Oct 5 |
| Temporary C-RNTI | Oct 6 |

FIG.3

METHOD FOR PERFORMING RACH PROCEDURE BETWEEN TERMINAL AND BASE STATION, AND BASE STATION AND TERMINAL THEREFOR

TECHNICAL FIELD

The disclosure relates to a method of performing an RACH procedure between a terminal and a base station, and a base station and a terminal using the method.

The research has been conducted with support from the "Cross-Departmental Giga-KOREA Project" (Ministry of Science and ICT) in 2017 (No. GK17N0100, development of a millimeter wave 5G mobile communication system).

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'beyond 4G network' or a 'Post long term evolution (LTE) System'.

As three main use cases of the 5G communication system, the communication industry including the international telecommunication union (ITU) and the 3rd partnership project (3GPP) have proposed enhanced mobile broadband (eMBB), ultra-reliable and low latency communications (URLLC), and massive machine type communication.

The 5G communication system is considered to be implemented in higher frequency (mmWave) bands, e.g., 60 GHz bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A 5G communication system defines a random access channel (RACH) procedure (hereinafter, referred to as an "RACH procedure") through which a terminal communicates with a base station through a network.

DISCLOSURE OF INVENTION

Technical Problem

A UE is required to necessarily perform a random access Channel (RACH) procedure in order to access a specific network.

For example, the terminal may transmit a random access (RA) preamble message to the base station according to the RACH procedure, receive an ra response (RAR) message from the base station, and perform a radio resource control (RRC) layer connection procedure.

In this case, a method of improving the RACH procedure and an apparatus for the same are provided to reduce a time required for the RRC layer connection and minimize resources of the terminal and the base station required for the RACH procedure.

In addition, technical problems to be solved by the disclosure are not limited to the above-described technical problems, and other technical problems that have not been mentioned can be clearly understood by those skilled in the art from the following description.

Solution to Problem

In accordance with an aspect of the disclosure, a method of performing a random access channel (RACH) procedure with a user equipment (UE) by a base station (BS) is provided. The method includes: receiving a random access (RA) preamble from the UE; generating a random access response (RAR) message including an uplink grant allocated to the UE, based on the received RA preamble; allocating physical downlink control channel resources for transmitting the generated RAR message; transmitting the RAR message to the UE through the allocated physical downlink control channel resources; and receiving a radio resource control (RRC) layer connection request message from the UE through resources allocated to the UE by the uplink grant.

In accordance with another aspect of the disclosure, a method of performing a random access channel (RACH) procedure with a base station (BS) by a user equipment (UE) is provided. The method includes: transmitting a random access (RA) preamble to the BS; acquiring an uplink grant from a random access response (RAR) message received through a physical downlink control channel, based on the transmitted RA preamble; and transmitting a radio resource control (RRC) layer connection request message to the BS through resources allocated by the acquired uplink grant.

In accordance with another aspect of the disclosure, a base station (BS) for performing a random access channel (RACH) procedure with a user equipment (UE) is provided. The BS includes: a communication unit configured to perform wireless communication with the UE; and a controller configured to receive a random access (RA) preamble from the UE through the communication unit, generate a random access response (RAR) message including an uplink grant allocated to the UE, based on the received RA preamble, allocate physical downlink control channel resources for transmitting the generated RAR message, control the communication unit to transmit the RAR message to the UE through the allocated physical downlink control channel resources, and receive a radio resource control (RRC) layer connection request message from the UE via the communication unit through resources allocated to the UE by the uplink grant.

In accordance with another aspect of the disclosure, a user equipment (UE) for performing a random access channel (RACH) procedure with a base station (BS) is provided. The UE includes: a communication unit configured to perform wireless communication with the BS; and a controller configured to transmit a random access (RA) preamble to the BS through the communication unit, acquire an uplink grant from a random access response (RAR) message received through a physical downlink control channel, based on the transmitted RA preamble, and control the communication unit to transmit a radio resource control (RRC) layer connection request message to the BS through resources allocated by the acquired uplink grant.

Advantageous Effects of Invention

According to the disclosure, it is possible to reduce a time required for decoding a random access response (RAR) message in a physical downlink shared channel.

Further, it is possible to minimize a delay time due to implementation since a procedure for an interface between schedulers for a random access channel (RACH) procedure is simplified.

In addition, it is possible to minimize the use of downlink resources (beams or frequencies) in a 5th generation (5G) communication system supporting beamforming.

In addition, other effects obtained or expected by embodiments of the disclosure will be directly or implicitly disclosed in the detailed description of the embodiments of the disclosure. For example, various effects expected according to embodiments of the disclosure will be disclosed in the detailed description to be described later.

BRIEF DESCRIPTION OF DRAWINGS

FIG. 2 illustrates types and locations of radio network temporary identifier (RNTI) values;

FIG. 3 illustrates a structure of a random access response (RAR) message in a 5th generation (5G)-media access control (MAC) layer;

BEST MODE FOR CARRYING OUT THE INVENTION

Figure 1:
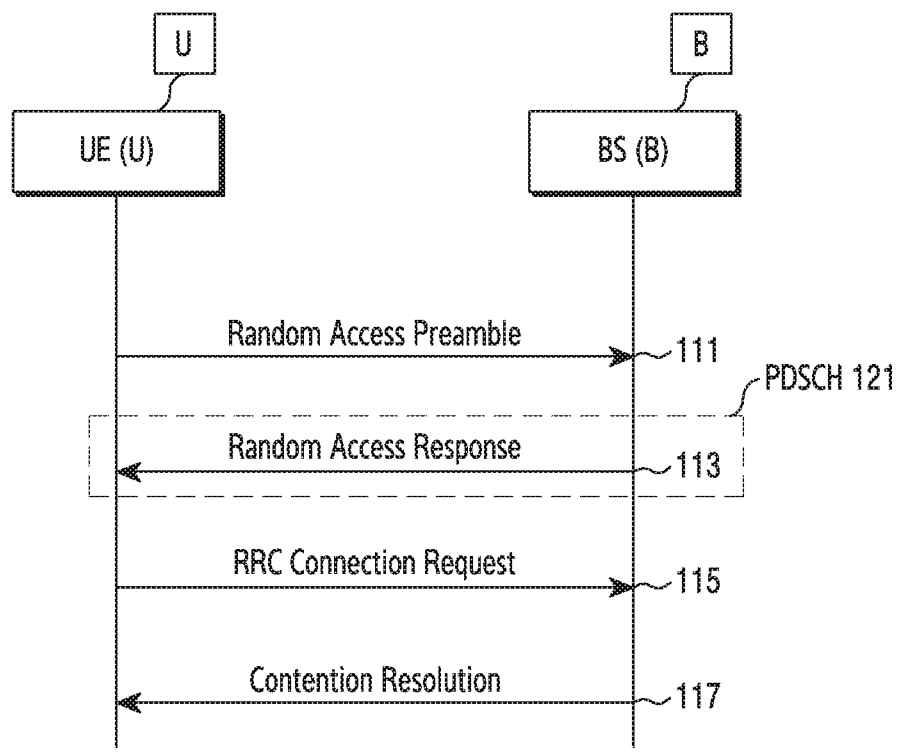
FIG. 1 illustrates a random access channel (RACH) procedure between a BS and a UE.

Hereinafter, operation principles of exemplary embodiments of the disclosure will be described in detail with reference to accompanying drawings. Like reference numerals designate like elements in the drawings where possible even though elements are shown in different drawings. In the following description of the disclosure, a detailed description of related known functions or configurations will be omitted so as not to obscure the subject of the disclosure. The terms which will be described below are terms defined in consideration of the functions in embodiments of the disclosure, and may vary depending on users, intentions of operators, or customs. Therefore, the definitions of the terms should be made based on the contents throughout the specification.

In an embodiment of the disclosure, the singular expressions "a" and "the" that do not clearly specify other content may be construed to include plural expressions.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the disclosure. As used herein, the term "and/or" includes any and all combinations of one or more associated items.

Terms used in an embodiment of the disclosure are used to merely describe a specific embodiment and not to limit the disclosure. As used herein, the singular forms are intended to include the plural forms as well, unless the context clearly indicates otherwise. In the disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "associated with", "associated therewith", and derivatives thereof used in an embodiment of the disclosure may mean "include", "be included within", "interconnect with", "contain", "be contained within", "connect to or with", "couple to or with", "be communicable with", "cooperate with", "interleave", "juxtapose", "be proximate to", "be bound to or with", "have", and "have a property of".

Further, in an embodiment of the disclosure, the phrase "a first element is (functionally or through communication) connected to a second element" or "a first element is (functionally or through communication) coupled to a second element" may mean that "an element is connected to another element directly or via yet another element (for example, a third element).

Unless defined otherwise, all terms used herein, including technical and scientific terms, have the same meaning as those commonly understood by a person of ordinary skill in the art to which the disclosure pertains. Such terms as those defined in a generally used dictionary are to be interpreted to have the meanings equal to the contextual meanings in the relevant field of art, and are not to be interpreted to have ideal or excessively formal meanings unless clearly defined in various embodiments of the disclosure.

In the detailed description of the disclosure, an example of interpretable meanings of some terms used in the disclosure is proposed. However, it is noted that the terms are not limited to the examples of the construable meanings which are proposed below.

A base station is a subject communicating with a user equipment, and may be referred to as a BS, a node B (NB), an evolved node B (eNodeB, eNB), an access point (AP), a fixed station, a base transceiver system (BTS), a macro eNB (MeNB), or a secondary eNB (SeNB).

A user equipment (or a communication UE) is an entity communicating with a BS or another UE, and may be referred to as a node, a UE, a mobile station (MS), a mobile equipment (ME), a device, a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, or a terminal.

FIG. 1 illustrates a random access channel (RACH) procedure between a BS and a UE.

A UE (U) may perform an RACH procedure in order to access a BS (B). For example, when a cell is detected in an idle state, the UE (U) may synchronize downlink and receive system information of a cell which the UE desires to access.

Subsequently, the UE (U) may perform an RACH procedure to make an RRC layer connection to the BS (B).

First, the UE (U) may allocate (or select) physical random access channel (PRACH) resources for transmitting a random access (RA) preamble message on the basis of the system information received from the BS (B) covering the cell.

Next, in process 111, the UE (U) may transmit an RA preamble message including a sequence corresponding to an RA preamble index randomly selected from an RA preamble set to the BS (B) according to a transmission time interval (TTI) of the allocated PRACH resources.

At this time, the RA preamble transmitted from the UE (U) to the BS (B) may be referred to as "message 1".

The BS (B) receiving the RA preamble may generate a random access response (RAR) message in response to "message 1" in process 113. The BS (B) may transmit the generated RA response message to the UE (U) through a physical downlink shared channel (PDSCH) (or a 5G physical downlink shared channel (xPDSCH)) 121.

Specifically, in response to the RA preamble, the BS (B) may perform an uplink scheduling operation for generating an uplink grant which is a control message including uplink resource allocation information. For example, when RA preambles are received from a plurality of UEs, the BS (B) may allocate uplink resources for each index of the RA preamble and configure one RA response message including an uplink grant containing uplink resource allocation information.

The BS (B) may add a cyclic redundancy check (CRC) to an RAR message which is a control message. The CRC may be masked by a unique identifier (Radio Network Temporary Identifier: RNTI) according to an owner or the use of a physical downlink control channel.

A [Table] in FIG. 2 illustrates types and locations of RNTI values. The types of the RNTI value may include, for example, a random access-radio network temporary identifier (RA-RNTI), a cell-radio network temporary identifier (C-RNTI), and a temporary C-RNTI.

In the RACH procedure, the BS (B) may mask a CRC of an RAR message transmitted through a PDCCH by a random access-radio network temporary identifier (RA-RNTI). The RA-RNTI may be used to identify an RA message by the UE (U).

The BS (B) may generate (or obtain) the RA-RANTI on the basis of an index of an RACH subframe acquired by decoding of the RA preamble and an RACH symbol index within an RACH subframe.

The RA-RNTI may be obtained on the basis of Equation 1 below.

$$RA\text{-}RNTI = 1 + t\_id \qquad \text{Equation 1}$$

where t_id ($0 \leq t\_id \leq 9$) is computed as $m*5+(I/2)$.

In Equation 1, m (m=0 or 1) may be an index of an RACH subframe within a specific frame. I(I=0, 2, 4, 6, 8) may be an index of an RACH symbol within a specific RACH subframe.

The BS (B) may wirelessly transmit the masked RAR message to the UE (U) through a physical downlink shared channel which is a data channel according to a downlink transmission time interval (DL TTI).

The RAR message may further include timing advance (TA) information for synchronizing uplink time of the UE (U) and a temporary cell identifier (temporary C-RNTI). FIG. 3 illustrates a structure of an RAR message showing locations of timing advance information, a temporary cell identifier, and an uplink grant in a 5G-MAC layer.

At this time, the RAR message in process 113, transmitted from the BS (B) to the UE (U) in response to "message 1" in process 111 may be referred to as "message 2".

The UE (U) may correct a time point at which data transmitted through an uplink channel is transmitted on the basis of the timing advance value included in the RAR message in order to perform synchronization for a call connection with the BS (B). The UE (U) may receive a temporary UE identifier from the BS (B) and store the same. The UE (U) may transmit an RRC layer connection request message to the BS (B) on the basis of the timing advance value, the temporary UE identifier, and the allocated resources included in the uplink grant, received from the BS (B) in process 115.

At this time, the RRC layer connection request message in process 115 transmitted from the UE (U) to the BS (B) on the basis of "message 2" in process 113 may be referred to as "message 3".

The BS (B) receiving the RRC layer connection request message may transmit a contention resolution message including the identifier transmitted from the UE (U) to the UE (U) in order to avoid collision between different UEs in process 117.

The UE (U) receiving the contention resolution message may identify whether the identifier of the UE included in the contention resolution message is the same as a value which the UE (U) transmitted. The UE (U) may continuously perform the following procedure when the identifier is the same, and may reinitiate the RACH procedure when the identifier is not the same.

Referring to FIG. 1, the RAR message may be transmitted from the BS (B) to the UE (U) through a physical downlink shared channel. In this case, a minimum time to transmission of "message 3" may be configured as 6 TTIs on the basis of "message 2" in consideration of a decoding time of the RAR message in the physical downlink shared channel. For another message, the minimum time may be 2 TTI larger than 4 TTIs which are a minimum time to transmission of the message through a physical uplink shared channel (PUSCH) in response to an uplink grant.

Further, the BS (B) may allocate uplink resources for "message 3" according to an uplink scheduling operation and allocate downlink resources for "message 2" according to a downlink scheduling operation. In this case, an implementation delay by an interface between schedulers for performing the scheduling operations may be needed. At this time, due to the implementation delay, allocation of the uplink resources for "message 3" may be temporally ahead of allocation of uplink resources for other UEs. That is, resources for "message 3" and resources for normal data cannot be simultaneously allocated in a transmission time interval of the physical uplink shared channel, but resources for "message 3" may be first allocated and then the corresponding resources may be reserved not to be allocated for other data in a preoccupancy scheme.

Further, the 5G communication system may support beamforming. Beam resources are one of resources that lack in the 5G communication system. The beam resources may be about 2 or 4 according to the number of physical antennas.

In the RACH procedure, the BS (B) may allocate beam resources for "message 2" in a downlink transmission time interval once and allocate beam resources for "message 3" in an uplink transmission time interval once. In this case, another beam which can be used by another UE (U) may be used for transmission of "message 2".

Figure 4:
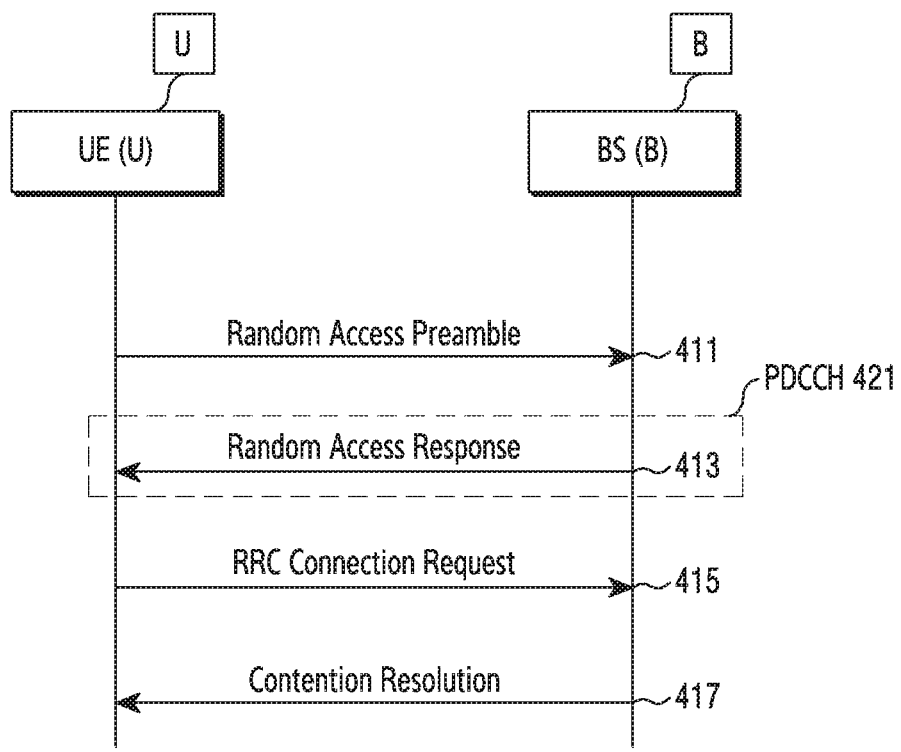
FIG. 4 illustrates an RACH procedure between the BS and the UE according to various embodiments of the disclosure.

FIG. 4 illustrates a random access channel (RACH) procedure between the BS and the UE according to an embodiment of the disclosure.

Referring to FIG. 4, the BS (B) may transmit "message 2" to the UE (U) through a physical downlink control channel instead of a physical downlink shared channel.

For example, information included in the RAR message may include timing advance (TA) information for synchronizing an uplink time of the UE (U), a temporary UE identifier (temporary C-RNTI), and an uplink grant (UL grant), and an amount of data of the information may be about 47 bits. Accordingly, it is possible to transmit the RAR message to the UE (U) through a physical downlink control channel (PDCCH) (or a 5G physical downlink control channel (xPDCCH)) to which 60 bits are allocated for a control message.

In order to transmit "message 2" through the physical downlink control channel, an RA-RNTI for masking "message 2" may be determined through a new scheme. That is, it is required to determine an RA-RNTI for each RA preamble.

At this time, the RA-RANTI may be generated (or obtained) on the basis of Equation 2, Equation 3, or Equation 4 below.

$$RA\text{-}RNTI=1+t\_id+p\_id, \quad \text{Equation 2}$$

where t_id ($0 \leq t\_id \leq 432$) is computed as $m5*48+(\frac{1}{2})*48$ $$RA\text{-}RNTI=1+t\_id+p\_id*10, \quad \text{Equation 3}$$

where t_id ($0 \leq t\_id \leq 9$) is computed as $m*5+(\frac{1}{2})$ $$RA\text{-}RNTI=1+t\_id+10*f\_id \quad \text{Equation 4}$$

Equation 4 may be defined in the LTE communication standard. In Equation 4, when $0 \leq t\_id < 10$ and $f\_id < 6$, the RA-RNTI may be calculated as $1+t\_id+10*f\_id+60*p\_id$.

In Equation 2, Equation 3, or Equation 4, m (m=0 or 1) may be an index of an RACH subframe within a specific frame. I(I=0, 2, 4, 6, 8) may be an index of an RACH symbol within a specific RACH subframe. p_id($0 \leq t\_id \leq 47$) may be a preamble index. At this time, the RA-RANTI may have a value of one of 1 to 480. The range of values of the RA-RNTI is only an example and may vary depending on a range of values of the preamble index defined in the standard.

In process 411 of FIG. 4, the UE (U) may transmit the RA preamble to the BS (B).

The BS (B) may generate the RA-RNTI using at least one of a preamble index value corresponding to a sequence included in the RA preamble, an RACH subframe index value, and an RACH symbol index value. The BS (B) may mask an RAR message including uplink resources for "message 3" in the physical downlink channel using the RA-RNTI.

In process 413, the BS (B) may transmit the masked RAR message to the UE (U) through a physical downlink control channel 421.

The UE (U) receiving the masked RAR message may generate the RA-RNTI using at least one of a preamble index value used for transmission of the RA preamble, an RACH index value, and an RACH symbol index value. The UE (U) may acquire an uplink grant included in the RAR message by decoding data received through the physical downlink control channel using the generated RA-RNTI.

In process 415, the UE (U) may transmit "message 3" to the BS (B) through the acquired uplink grant.

The BS (B) receiving the RRC layer connection request message may transmit a contention resolution message including the identifier transmitted from the UE (U) to the UE (U) in order to avoid collision between different UEs in process 417.

According to the RACH procedure of FIG. 4, the RAR message is masked using the RA-RNTI. The RA-RNTI, may be determined on the basis of information acquired from the RA preamble (for example, an index of a sequence and information related to resources for transmitting the RA preamble). That is, the RAR message may be masked on the basis of at least one value acquired from the corresponding RA preamble. Accordingly, in another embodiment, various modified values such as a combination of the RA-RNTI and another bitstream, a portion of the RA-RNTI, or a combination of the portion of the RA-RNTI and another bitstream may be used for masking in addition to the above-described RA-RNTI. Further, in another embodiment, a value for masking may be defined regardless of the RA-RNTI.

According to the RACH procedure of FIG. 4, when the RAR message is transmitted through the physical downlink control channel, a time required for decoding the physical downlink shared channel may be saved. Accordingly, the minimum time to transmission of "message 3" in response to "message 2" may be improved to 4 TTIs that are the minimum time to transmission of the message through the physical uplink shared channel on the basis of the uplink grant.

Further, the minimum time to transmission of "message 3" in response to "message 2" may be reduced and thus become the same as the minimum time to transmission of the uplink shared channel in response to the uplink grant. Accordingly, an uplink scheduler of the BS (B) may determine scheduling for all UEs only once, and thus implementation complexity due to preoccupancy of resources for "message 3" may be reduced and optimization (CPU load reduction) may be achieved.

According to the RACH procedure of FIG. 4, the BS (B) may minimize a delay time due to implementation since an interface between an uplink scheduler for receiving "message 3" and a downlink scheduler for transmitting "message 2" can be omitted. That is, an implementation delay due to a call connection may be minimized and a connection time may be reduced.

According to the RACH procedure of FIG. 4, in the 5G communication system supporting beamforming, as the physical downlink control channel is used for allocating resources for transmission of "message 2", downlink resources (beam or frequency) can be saved and another UE can use the downlink resources.

Figure 5:
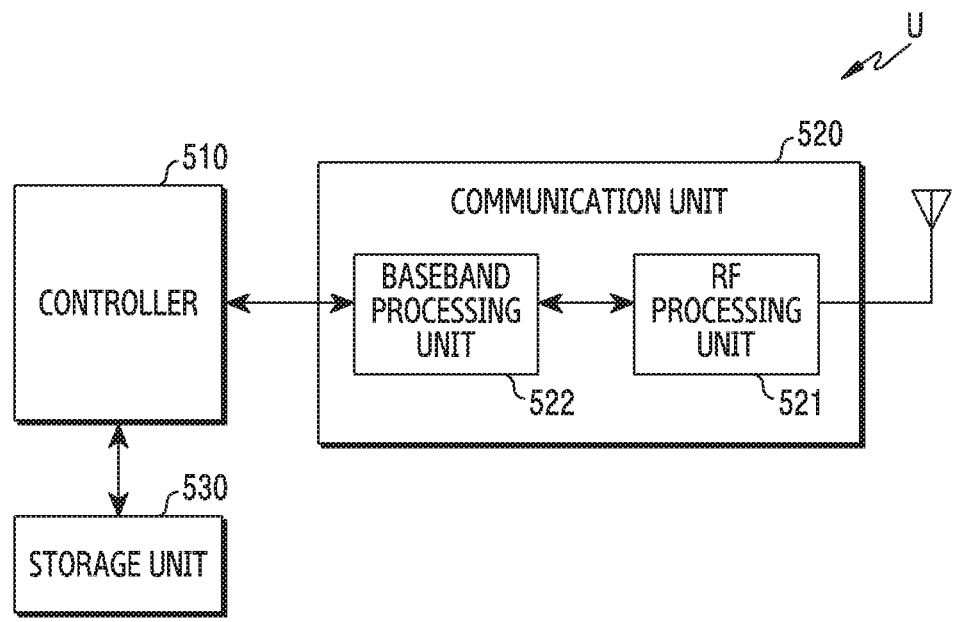
FIG. 5 illustrates a structure of the UE according to various embodiments of the disclosure.

FIG. 5 illustrates a structure of the UE according to an embodiment of the disclosure.

Referring to FIG. 5, the UE (U) includes a controller 510, a communication unit 520, and a storage unit 530.

The communication unit 520 includes a radio frequency (RA) processing unit 521 and a baseband processing unit 522.

The RF processing unit 521 performs a function of transmitting and receiving a signal through a radio channel such as converting or amplifying a band of the signal. That is, the RF processing unit 521 up-converts a baseband signal provided from the baseband processing unit 522 into an RF band signal, transmits the RF band signal through an antenna, and then down-converts the RF band signal received through the antenna into a baseband signal. For example, the RF processing unit 521 may include a transmission filter, a reception filter, an amplifier, a mixer, an oscillator, a digital-to-analog converter (DAC), an analog-to-digital converter (ADC), and the like. Although FIG. 5 illustrates only one antenna, the UE (U) may include a plurality of antennas. In addition, the RF processing unit 521 may include a plurality of RF chains. Moreover, the RF processing unit 521 may perform beamforming. For the beamforming, the RF processing unit 521 may control a phase and a size of each of the signals transmitted/received through a plurality of antennas or antenna elements. The RF processing unit may perform MIMO and receive a plurality of layers when performing the MIMO operation. The RF processing unit 521 may appropriately configure a plurality of antennas or antenna elements according to the control of the controller to perform reception beam sweeping or control a direction of a reception beam and a beam width so that the reception beam corresponds to a transmission beam.

The baseband processing unit 522 performs a function for conversion between a baseband signal and a bit string according to a physical layer standard of a system. For example, in data transmission, the baseband processing unit 522 generates complex symbols by encoding and modulating a transmission bitstream. Further, in data reception, the baseband processing unit 522 reconstructs a reception bitstream by demodulating and decoding a baseband signal provided from the RF processing unit 521. For example, in an orthogonal frequency division multiplexing (OFDM) scheme, when data is transmitted, the baseband processing unit 522 generates complex symbols by encoding and modulating a transmission bitstream, mapping the complex symbols to subcarriers, and then configures OFDM symbols through an inverse fast fourier transform (IFFT) operation and a cyclic prefix (CP) insertion. Further, when data is received, the baseband processing unit 522 divides the baseband signal provided from the RF processor 521 in the unit of OFDM symbols, reconstructs the signals mapped to the subcarriers through a fast fourier transform (FFT) operation, and then reconstructs a reception bitstream through demodulation and decoding.

The baseband processing unit 522 and the RF processing unit 521 transmit and receive signals as described above. Accordingly, the baseband processing unit 522 or the RF processing unit 521 may be referred to as a communication unit 520, a transmitter, a receiver, or a transceiver. Further, at least one of the baseband processing unit 522 and the RF processing unit 521 may include a plurality of communication modules to support a plurality of different radio access technologies. In addition, at least one of the baseband processing unit 522 and the RF processing unit 521 may include different communication modules to process signals of different frequency bands. For example, the different radio access technologies may include an LTE network and an NR network. Further, the different frequency bands may include a super high frequency (SHF) (for example, 2.5 GHz and 5 Ghz) band and a millimeter (mm) wave (for example, 60 GHz) band.

The storage unit (or memory) 530 stores data such as a basic program, an application, and setting information for the operation of the UE (U). The storage unit 530 provides the stored data according to a request from the controller 510. For example, the storage unit 530 may store a timing advance value acquired through the RACH procedure according to the disclosure. The storage unit 530 may include one memory or a plurality of memory elements. In the following description, the storage unit 530 includes all of the terms.

The controller (or processor) 510 controls the overall operation of the UE (U). For example, the controller 510 transmits/receives a signal through the communication unit 520. In addition, the controller 510 may record data in the storage unit 530 and read the data. To this end, the controller 510 may include at least one processor. For example, the controller 510 may include a communication processor (CP) that performs a control for communication, and an application processor (AP) that controls a higher layer such as an application.

According to various embodiments, the BS (B) may include a communication unit 520 for performing wireless communication with the UE (U), and a controller 510 for receiving a random access (RA) preamble from the UE (U) through the communication unit 520, generating an RA response message including an uplink grant allocated to the UE (U) on the basis of the received RA preamble, allocating physical downlink control channel resources for transmitting the generated RAR message, controlling the communication unit 520 to transmit the RAR message to the UE (U) through the allocated physical downlink control channel resources, and receiving a radio resource control (RRC) layer connection request message from the UE (U) via the communication unit 520 through the resources allocated to the UE (U). According to an embodiment, the controller 510 may mask the RAR message transmitted in the physical downlink control channel using a random access-radio network temporary identifier (RA-RANTI) value. According to an embodiment, the random access temporary identifier value may be generated on the basis of an RACH subframe index value and an RACH symbol index value used for transmitting the RA preamble. According to an embodiment, the random access temporary identifier value may be generated on the basis of a preamble index value corresponding to a sequence included in the RA preamble. According to an embodiment, the random access temporary identifier value may be one of 1 to 480.

In addition to the above-described operation, the controller 510 may further perform not only control operations required for FIGS. 1 and 3 but also control operations required for the following control flowchart.

Figure 6:
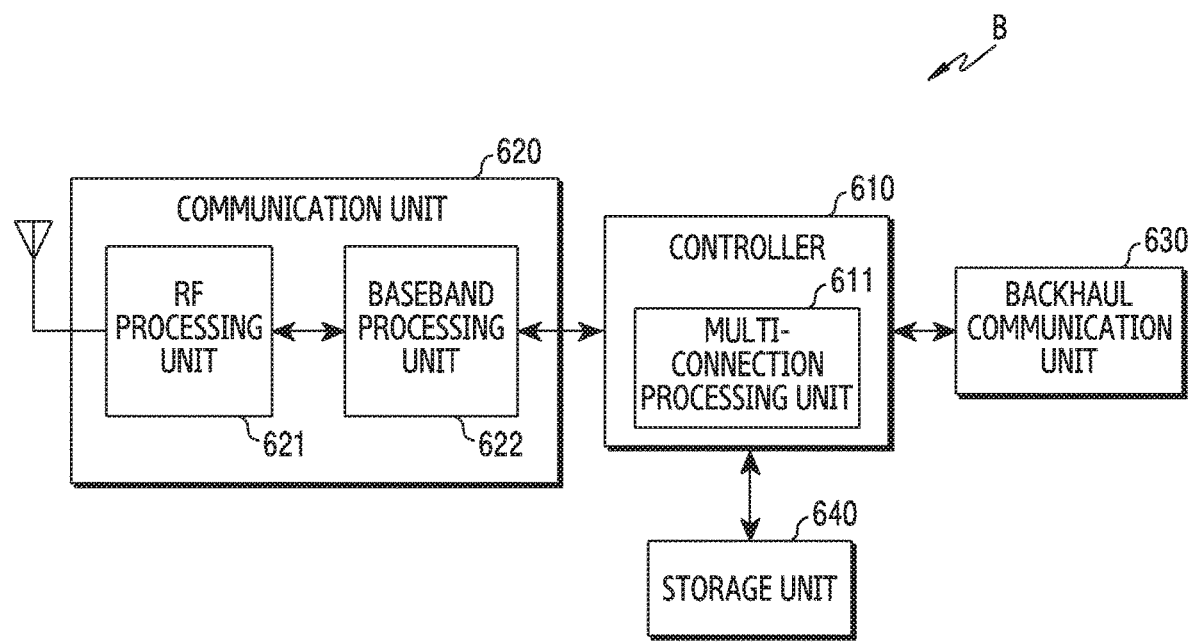
FIG. 6 illustrates a structure of the BS according to various embodiments of the disclosure.

FIG. 6 illustrates a structure of the BS according to an embodiment of the disclosure.

The BS (B) of FIG. 6 includes a controller 610, a communication unit 620, a backhaul communication unit 630, and a storage unit 640.

The communication unit 620 includes an RF processing unit 621 and a baseband processing unit 622.

The RF processing unit 621 performs a function of transmitting and receiving a signal through a radio channel such as converting or amplifying a band of the signal. That is, the RF processing unit 621 up-converts a baseband signal provided from the baseband processing unit 622 into an RF band signal, transmits the RF band signal through an antenna, and then down-converts the RF band signal received through the antenna into a baseband signal. For example, the RF processing unit 621 may include a transmission filter, a reception filter, an amplifier, a mixer, an oscillator, a DAC, and an ADC. Although FIG. 6 illustrates only one antenna, the BS (B) may include a plurality of antennas. In addition, the RF processing unit 621 may include a plurality of RF chains. Moreover, the RF processing unit 621 may perform beamforming. For the beamforming, the RF processing unit 621 may control a phase and a size of each of the signals transmitted and received through a plurality of antennas or antenna elements. The RF processing unit may perform a downlink MIMO operation by transmitting one or more layers.

The baseband processing unit 622 performs a function for conversion between a baseband signal and a bit string according to a physical layer standard of a system. For example, in data transmission, the baseband processing unit 622 generates complex symbols by encoding and modulating a transmission bitstream. Further, in data reception, the baseband processing unit 622 reconstructs a reception bitstream by demodulating and decoding a baseband signal provided from the RF processing unit 621. For example, in an OFDM scheme, when data is transmitted, the baseband processing unit 622 may generate complex symbols by encoding and modulating the transmission bitstream, map the complex symbols to subcarriers, and then configure OFDM symbols through an IFFT operation and CP insertion. In addition, when data is received, the baseband processing unit 622 divides a baseband signal provided from the RF processing unit 621 in units of OFDM symbols, recovers signals mapped with subcarriers through an FFT operation, and then recovers a reception bit string through demodulation and decoding. The baseband processing unit 622 and the RF processing unit 621 transmit and receive signals as described above. Accordingly, the baseband processing unit 622 or the RF processing unit 621 may be referred to as the communication unit 620, a transmitter, a receiver, a transceiver, or a wireless communication unit.

The backhaul communication unit 630 provides an interface for communicating with other nodes within the network. For example, the backhaul communication unit 630 may provide an interface with a higher layer node and an interface with another adjacent BS.

The storage unit (or memory) 640 stores data such as a basic program, an application, and setting information for the operation of the BS (B). Particularly, the storage unit 640 may store information on bearers allocated to the accessed UE and the measurement result reported from the accessed UE. Further, the storage unit 640 may store information which is a reference for determining whether to provide multiple connections to the UE or stop the multiple connections. In addition, the storage unit 640 provides data stored therein according to a request from the controller 610. The storage unit 640 may store information on a state of synchronization with adjacent BSs. The storage unit 640 may store information on omission of some or all of the RA procedure from the UE and further store control information thereof. Further, the storage unit 640 may store information required during the operation of FIGS. 1 and 3 and/or information for controlling the same, and information according to the following operation and/or information for controlling the same.

The controller (or processor) 610 controls the overall operation of the BS (B). For example, the controller 610 transmits and receives a signal through the baseband processing unit 622 and the RF processing unit 621 or through the backhaul communication unit 630. In addition, the controller 610 may record data in the storage unit 640 and read the data. To this end, the controller 610 may include at least one processor.

According to various embodiments, the UE (U) may include the communication unit 620 for performing wireless communication with the BS (B) and the controller 610 for transmitting a random access (RA) preamble to the BS (B) through the communication unit 620, acquiring an uplink grant from an ra response (RAR) message received through a physical downlink control channel on the basis of the transmitted RA preamble, and controlling the communication unit 620 to transmit a radio resource control (RRC) layer connection request message to the BS (B) through resources allocated by the acquired uplink grant. According to an embodiment, the controller 610 may decode data received through the physical downlink control channel using a random access temporary identifier value in order to acquire the uplink grant from the RAR message. According to an embodiment, the random access temporary identifier value may be generated on the basis of an RACH subframe index value and an RACH symbol index value used for transmitting the RA preamble. According to an embodiment, the random access temporary identifier value may be generated on the basis of a preamble index value corresponding to a sequence included in the RA preamble. According to an embodiment, the random access temporary identifier value may be one of 1 to 480.

The controller 610 may control the operation for omitting some or all of the RA procedure from the UE and perform the control operation required among the operations of FIGS. 1 and 3 and the control operation described below.

Figure 7:
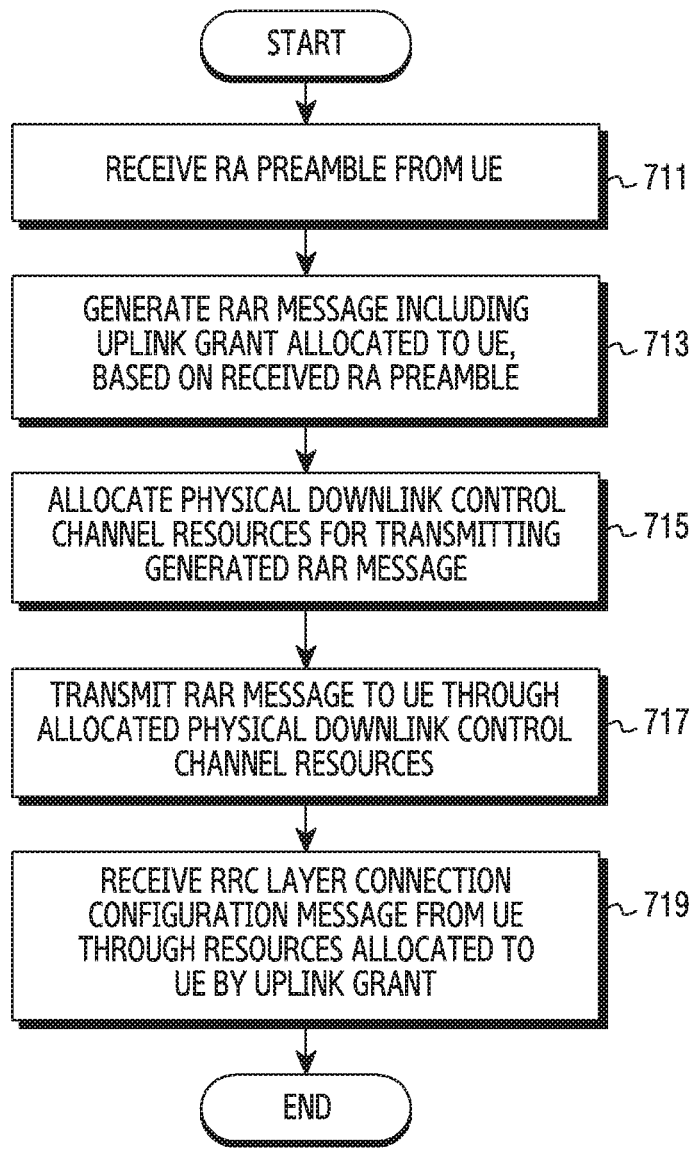
FIG. 7 is a flowchart illustrating an RACH procedure of the BS with the UE according to various embodiments of the disclosure.

FIG. 7 is a flowchart illustrating an RA procedure between the BS and the UE according to an embodiment of the disclosure.

In process 711, the BS (B) may receive an RA preamble from the UE (U). The RA preamble may include a sequence corresponding to an RA preamble index selected by the UE (U) and may be received through a specific RACH subframe and a specific RACH symbol.

In process 713, the BS (B) may generate an RAR message including an uplink grant allocated to the UE (U) on the basis of the received RA preamble.

At this time, the BS (B) may mask the RAR message in the physical downlink channel using a random access temporary identifier (RA-RNTI) value. The RA-RNTI value may be generated on the basis of an RACH subframe index value and an RACH symbol index value used for transmitting the preamble. Further, the RA-RNTI value may be generated on the basis of a preamble index value corresponding to the sequence included in the RA preamble. The RA-RNTI value may have a value of one of 1 to 480.

In process 715, the BS (B) may allocate physical downlink control channel resources for transmitting the generated RAR message.

In process 717, the BS (B) may transmit the RAR message to the UE (U) through the allocated physical downlink control channel resources.

In process 719, the BS (B) may receive an RRC layer connection request message from the UE (U) through resources allocated to the UE (U) by an uplink grant.

Figure 8:
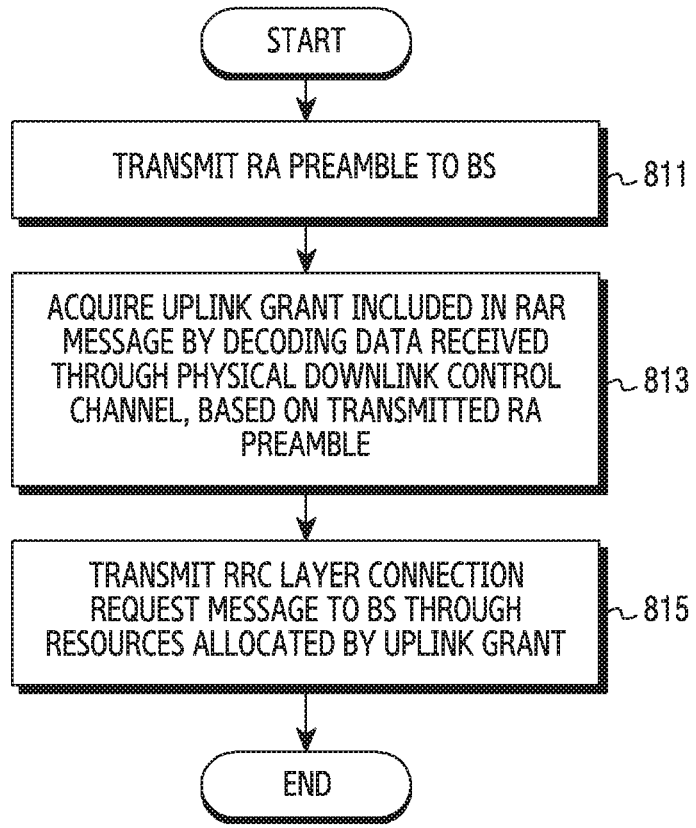
FIG. 8 is a flowchart illustrating an RACH procedure of the UE with the BS according to various embodiments of the disclosure.

FIG. 8 is a flowchart illustrating an RACH procedure between the UE and the BS according to an embodiment of the disclosure.

In process 811, the UE (U) may transmit an RA preamble to the BS (B). The RA preamble may include a sequence corresponding to an RA preamble index selected by the UE (U) and may be transmitted through a specific RACH subframe and a specific RACH symbol.

In process 813, the UE (U) may acquire the uplink grant included in the RAR message by decoding data received through the physical downlink control channel on the basis of the transmitted RA preamble. The uplink grant may include information on allocated resources for transmitting the RRC layer connection request message.

In this case, the UE (U) may decode the data received through the physical downlink control channel using an RA-RNTI value. At this time, the RA-RNTI value may be generated on the basis of an RACH subframe index value and an RACH symbol index value used for transmitting the preamble. Further, the RA-RNTI value may be generated on the basis of a preamble index value corresponding to the sequence included in the RA preamble. The RA-RNTI value may be one of 1 to 480.

In process 815, the UE (U) may transmit the RRC layer connection request message to the BS (B) through resources allocated by the acquired uplink grant.

The disclosed embodiments may be implemented by an S/W program including a command stored in computer-readable storage media.

A computer is a device capable of loading a stored command from a storage medium and operating according to the disclosure embodiments on the basis of the loaded command, and may include the UE (U) and the BS (B) according to the disclosure embodiments.

The machine-readable storage media may be provided in the form of non-transitory storage media. Here, the term "non-transitory" only means that the storage media is tangible without including a signal, irrespective of whether data is semi-permanently or transitorily stored in the storage media.

Further, a method according to the disclosed embodiments may be provided through a computer program product. The computer program product may be traded as a product between a seller and a buyer.

The computer program product may include an S/W program and a computer-readable storage medium storing the S/W program. For example, the computer program product may include a manufacturer of the UE and the BS, or a product in an S/W program type (for example, a downloadable app) electronically distributed through an electronic market (for example, Google Store or App Store). For electronic distribution, at least some of the S/W program may be stored in a storage medium or may be temporarily generated. In this case, the storage medium may be a storage medium of a server of a manufacturer, a server of an electronic market, or a relay server for temporarily storing an SW program.

The invention claimed is:

1. A method performed by a base station (BS) in a wireless communication system, the method comprising:
   receiving a random access (RA) preamble from a user equipment (UE);
   generating a random access response (RAR) message including an uplink grant allocated to the UE, based on the received RA preamble;
   masking the RAR message using at least one of a random access-radio network temporary identifier (RA-RNTI) and a bitstream, a portion of the RA-RNTI, or a combination of the portion of the RA-RNTI and a bitstream;
   allocating physical downlink control channel resources for transmitting the RAR message;
   transmitting the RAR message to the UE through the allocated physical downlink control channel resources; and
   receiving a radio resource control (RRC) layer connection request message from the UE through resources allocated to the UE by the uplink grant.

2. The method of claim 1, further comprising masking the RAR message transmitted through the physical downlink control channel resources using an RA-RNTI value.

3. The method of claim 2, wherein the RA-RNTI value is generated based on a RACH subframe index value and a RACH symbol index value used to transmit the RA preamble.

4. The method of claim 2, wherein the RA-RNTI value is generated based on a preamble index value corresponding to a sequence included in the RA preamble.

5. The method of claim 2, wherein the RA-RNTI value is one of 1 to 480.

6. A method performed by a user equipment (UE) in a wireless communication system, the method comprising:
   transmitting a random access (RA) preamble to a base station (BS);
   receiving a random access response (RAR) message received through a physical downlink control channel, based on the transmitted RA preamble;
   decoding the RAR message using at least one of a random access-radio network temporary identifier (RA-RNTI) and a bitstream, a portion of the RA-RNTI, or a combination of the portion of the RA-RNTI and the bitstream; and
   acquiring an uplink grant from the RAR message; and
   transmitting a radio resource control (RRC) layer connection request message to the BS through resources allocated by the acquired uplink grant.

7. The method of claim 6, wherein the acquiring of the uplink grant from the RAR message comprises decoding data received through the physical downlink control channel using an RA-RNTI value.

8. The method of claim 7, wherein the RA-RNTI value is generated based on a RACH subframe index value and a RACH symbol index value used to transmit the preamble.

9. The method of claim 7, wherein the RA-RNTI value is generated based on a preamble index value corresponding to a sequence included in the RA preamble.

10. The method of claim 8, wherein the RA-RNTI value is one of 1 to 480.

11. A base station (BS) in a wireless communication system, the BS comprising:
    a transceiver configured to perform wireless communication with a user equipment (UE); and
    at least one processor configured to:
      receive a random access (RA) preamble from the UE through the transceiver,
      generate a random access response (RAR) message including an uplink grant allocated to the UE, based on the received RA preamble,
      mask the RAR message using at least one of a random access-radio network temporary identifier (RA-RNTI) and a bitstream, a portion of the RA-RNTI, or a combination of the portion of the RA-RNTI and a bitstream,
      allocate physical downlink control channel resources for transmitting the RAR message,
      control the transceiver to transmit the RAR message to the UE through the allocated physical downlink control channel resources, and
      receive a radio resource control (RRC) layer connection request message from the UE via the transceiver through resources allocated to the UE by the uplink grant.

12. The BS of claim 11, wherein the controller at least one processor masks the RAR message transmitted through the physical downlink control channel resources using an RA-RNTI value.

13. The BS of claim 12, wherein the RA-RNTI value is generated based on a RACH subframe index value and a RACH symbol index value used to transmit the RA preamble.

14. The BS of claim 12, wherein the RA-RNTI value is generated based on a preamble index value corresponding to a sequence included in the RA preamble.

15. The BS of claim 12, wherein the RA-RNTI value is one of 1 to 480.

* * * * *